Figure 8:
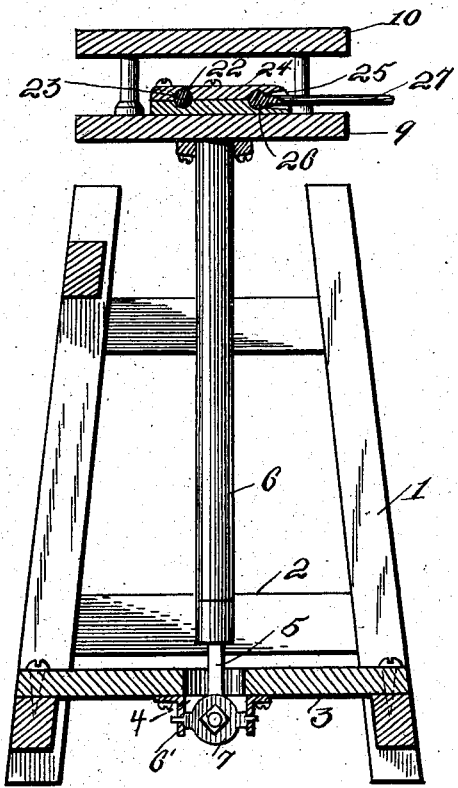

No. 747,870. PATENTED DEC. 22, 1903.
D. DRAWBAUGH.
MEANS FOR SHAKING MILK IN TESTING BOTTLES.
APPLICATION FILED JAN. 6, 1903. RENEWED OCT. 24, 1903.
NO MODEL. 4 SHEETS—SHEET 1.
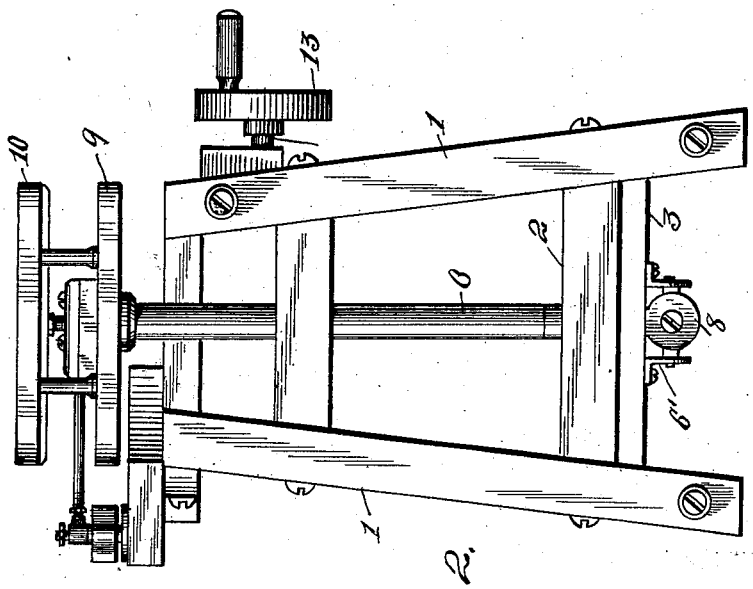
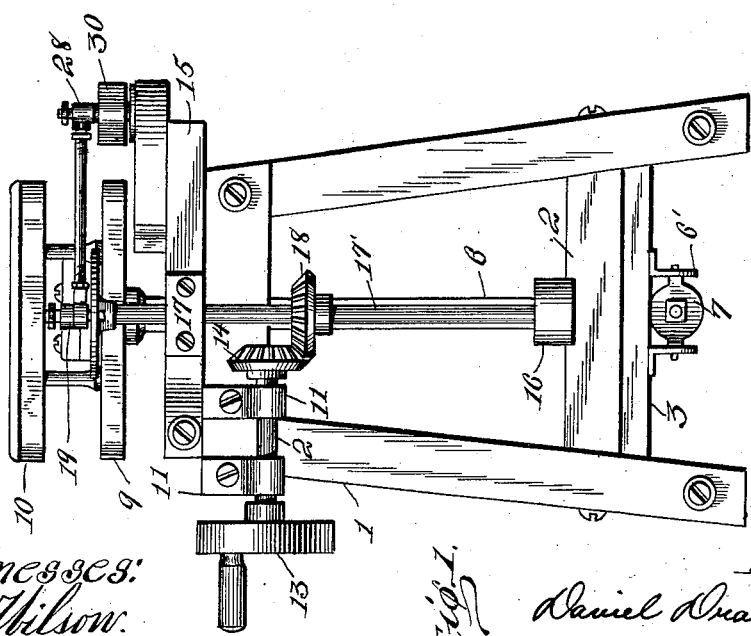
Witnesses:
L. E. Wilson.
Will G. Crowley.
Inventor
Daniel Drawbaugh,
by David P. Moore,
Attorney.

No. 747,870. PATENTED DEC. 22, 1903.
D. DRAWBAUGH.
MEANS FOR SHAKING MILK IN TESTING BOTTLES.
APPLICATION FILED JAN. 6, 1903. RENEWED OCT. 24, 1903.
NO MODEL. 4 SHEETS—SHEET 2.
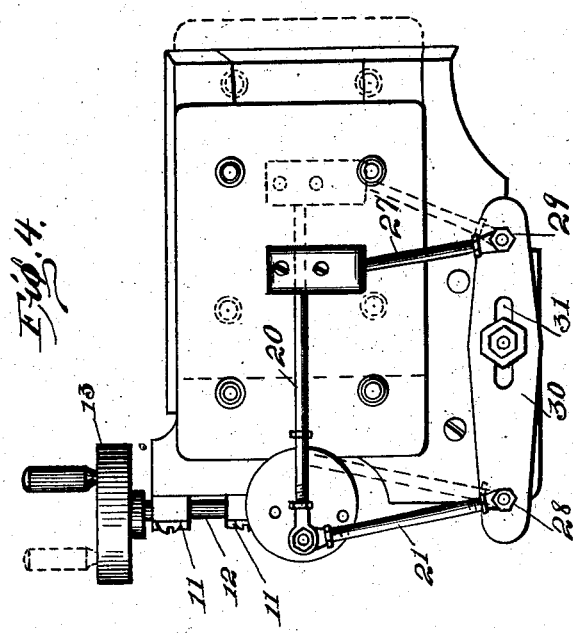
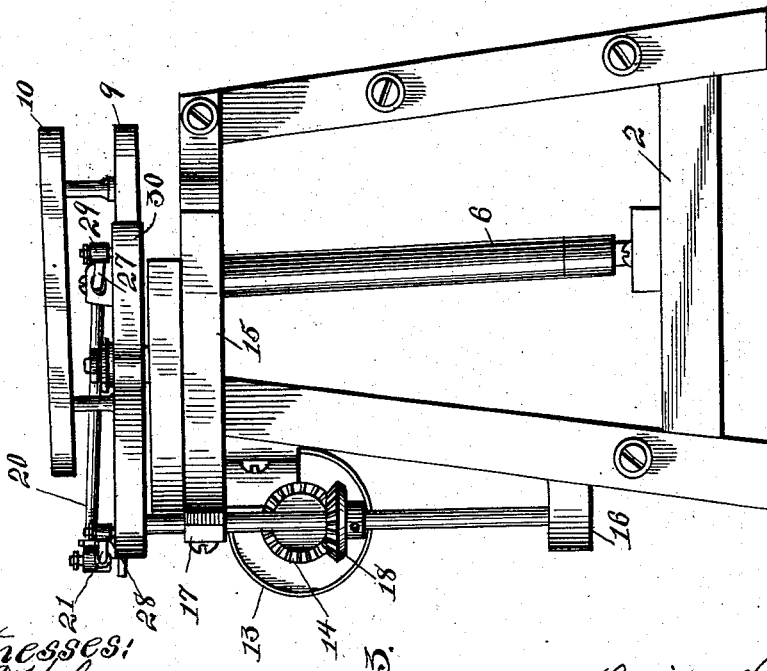

No. 747,870. PATENTED DEC. 22, 1903.
D. DRAWBAUGH.
MEANS FOR SHAKING MILK IN TESTING BOTTLES.
APPLICATION FILED JAN. 6, 1903. RENEWED OCT. 24, 1903.
NO MODEL. 4 SHEETS—SHEET 3.
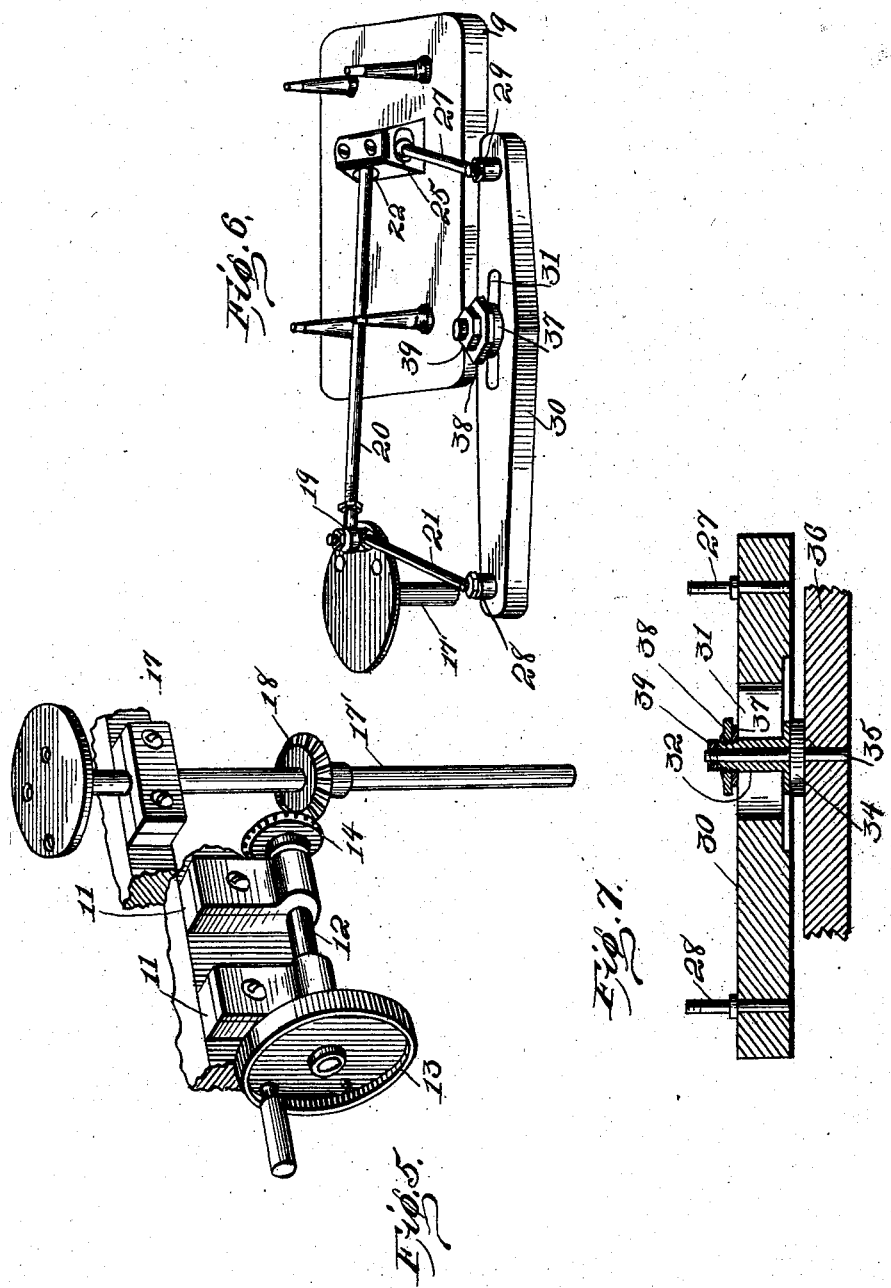

No. 747,870. PATENTED DEC. 22, 1903.
D. DRAWBAUGH.
MEANS FOR SHAKING MILK IN TESTING BOTTLES.
APPLICATION FILED JAN. 6, 1903. RENEWED OCT. 24, 1903.
NO MODEL. 4 SHEETS—SHEET 4.

No. 747,870. Patented December 22, 1903.

UNITED STATES PATENT OFFICE.

DANIEL DRAWBAUGH, OF EBERLYS MILL, PENNSYLVANIA.

MEANS FOR SHAKING MILK IN TESTING-BOTTLES.

SPECIFICATION forming part of Letters Patent No. 747,870, dated December 22, 1903.

Application filed January 6, 1903. Renewed October 24, 1903. Serial No. 178,417. (No model.)

*To all whom it may concern:*

Be it known that I, DANIEL DRAWBAUGH, a citizen of the United States, residing at Eberlys Mill, in the county of Cumberland and State of Pennsylvania, have invented certain new and useful Improvements in Means for Shaking Milk in Testing-Bottles, of which the following is a specification.

This invention relates to improvements in means for shaking milk in testing-bottles; and the main object of my invention is the provision of a simple mechanism by which the testing-bottles are given a substantially rotary motion, thus thoroughly shaking the same for the purpose of testing.

To this end the machine, as shown in the drawings, embodies my invention.

Figure 10:
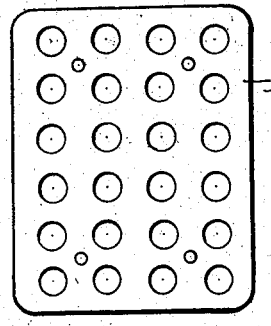
Figure 9:
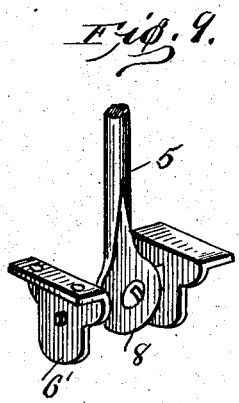

Figure 1 is a side elevation of a machine taken from the power-transmitting side. Fig. 2 is a similar view taken from the opposite side. Fig. 3 is an end view thereof. Fig. 4 is a top plan view with the bottle-holding plate removed therefrom, full lines showing one position of the center and dotted lines showing the opposite position which the mechanism causes it to assume. Fig. 5 is a detail view of the vertical shaft and means for revolving the same. Fig. 6 is a detached view of the mechanism operated by the vertical shaft to impart a rotary movement to the bottle-holding plate. Fig. 7 is a sectional view through the pivoted lever of said mechanism. Fig. 8 is a vertical sectional view through the table, its support, and a portion of the frame to show the details of construction; and Fig. 9 is a detail view of the swivel connection for the lower part of the table-support. Fig. 10 is a detail view of a part of my machine.

Referring to the drawings, the numeral 1 designates the substantially vertical posts, and 2 the lower cross-pieces and the framework. Connected to and spanning the space between the bar of the lower cross-piece is a bar 3, which is provided with a central vertical opening 4, through which is adapted to pass the shank 5, supporting the cylindrical support 6. Secured and depending from the lower side of this bar 3 are two lugged plates 6'. Each is provided with alined bearings for the reception of the opposite ends of the member 7 of the swivel and shank carrying the other member 8, which by means of a bolt is securely yet removably secured to the first member. Carried upon the upper end of the cylindrical support is a table 9, which has mounted thereon a perforated plate or board 10 for the reception of the milk-testing bottles. Mounted in the journal-boxes 11, upon the outer portion of the frame in one of the upper corners thereof, is a shaft 12, which carries upon its outer end a wheel 13 and upon its inner end a beveled pinion 14. Secured to the projecting portion of the top L-shaped frame 15 and alined with the bearing-block 16 is a boxing 17, which in connection with the boxing 16 forms a bearing for the vertical shaft 17'. This shaft has its lower end mounted in the lower end of the frame 2 and its upper end within the boxing 17. Adjustably mounted upon this vertical shaft between the boxes is a beveled pinion 18, which is adapted to mesh with the other beveled pinion and transmit thereby a rotary motion to the circular plate or the disk carried by the upper end of the vertical shaft. Connected to and projecting above this plate eccentrically thereof is an arm 19, which has pivoted thereto the ends of the connecting-rods 20 and 21, respectively. Upon the opposite end of the rod 20 I provide the belt 22, which is mounted in the socket 23, formed in the block 24, which is carried upon the upper face of the table. In the opposite end of this block is provided another socket 25, in which is mounted a ball 26, carried upon one end of the rod 27. The outer ends of the rods 21 and 27 are pivotally secured to the arms 28 and 29, respectively, carried upon the ends of the pivotally-mounted lever 30. This lever is provided with an elongated slot 31, in which is mounted the threaded bushing 32 upon its lower end and surrounding the enlarged portion 34 of the vertical journal 35, secured upon the outer face of the block 36. In order to properly hold this lever at the proper adjustment, and thereby limit the rotary movement of the table, I provide a washer 37 and a lock-nut 38, which surrounds the bushing, and to hold the bushing securely upon the journal I employ the nut 39.

From the foregoing description, taken in connection with the drawings, it is evident that I provide a machine of this character which is the embodiment of simplicity, durability, and inexpensiveness, and thereby produce a thoroughly efficient and practical device for this purpose.

What I claim as new is—

1. In a machine of this character, the combination of a suitable framework, a vertical shaft having its lower end swivelly mounted within said framework, and mechanism mounted in the framework and connected with the upper end of said shaft for imparting to the upper end an elliptical and outwardly-tilting motion.

2. In a machine of this character, the combination of a suitable framework, a table-supporting means having its lower end swivelly mounted within the framework and its upper end projecting above the same, a table carried upon the upper end thereof, and mechanism mounted in the framework and connected to the upper end of said table-supporting means for imparting to the upper end thereof an elliptical and outwardly-tilting motion.

3. In a machine of this character, the combination of a framework, a swivel mounted in the lower portion of the framework, a table-supporting column having its lower end mounted in said swivel, and mechanism mounted in the framework and connected to the upper end of the column for imparting an elliptical and tilting motion to the upper end thereof.

4. In a machine of this character, the combination of a framework, a table-supporting column having its lower end swivelly mounted therein, and its upper end projecting above the framework, means for limiting the movement of the upper end of the column mounted in the framework and connected to the upper part of the column, said means being adjustable so as to limit the movement of the upper end of the column, and mechanism journaled in the framework and connected to said limiting means so as to impart thereto a movement which causes the upper end of the column to have an elliptical and outwardly-tilting motion.

5. In a machine of this character, the combination of a frame, a column having its lower end swivelly mounted therein and having its upper end projecting above the frame, a table carried upon its upper end, adjustable means mounted upon the upper end of the frame and connected to the upper end of the column for regulating the rotary motion of the upper end of the column, and mechanism carried by the frame for operating said adjustable means to impart to the upper end of the column such rotary motion.

6. In a machine of this character, the combination of a frame, a column having its lower end swivelly mounted within the frame and its upper end projecting above the frame, a vertical shaft journaled in the frame adapted to receive a rotary movement, and means to limit the rotary movement of the upper end of the column mounted upon the frame and connected with the vertical shaft, said means being operated by the vertical shaft and imparting to the upper end of the column an elliptical and outwardly-tilting motion.

7. In a machine of this character, the combination of a frame, a column having its lower end swivelly mounted within the frame and its upper projecting above the frame, a shaft vertically journaled in the frame to one side of the column, and adjustable means mounted upon the frame and connected to the upper end of the vertical shaft and the upper end of the column, whereby the vertical shaft imparts to the upper end of the column an elliptical movement, the said adjustable means being so constructed as to regulate the shape of the ellipse that the upper end of the column describes.

8. In a machine of this character, the combination of a frame, a column having its lower end swivelly mounted in the lower end of the frame and its upper end projecting above the upper end of the frame, means for holding the testing-bottles carried by the upper end of said column a revoluble shaft mounted in said frame, and mechanically-operated means connected to the upper end of said column for imparting to the top of the column an elliptical and outwardly-tilting movement.

9. In a machine of this character, the combination of a frame, a column having its lower end swivelly mounted in the lower end of the frame and its upper end projecting above the upper end of the frame, means for holding the testing-bottles carried by the upper end of said column, a revolubly-mounted shaft mounted in said frame, and mechanism adjustably mounted upon the upper end of the frame connected to the upper end of the vertical shaft and the column for imparting an elliptical and outwardly-tilting movement to the upper end of the column.

10. In a machine of this character, the combination of a frame, a swivel carried in the lower end thereof, and vertical column having its lower end connected to said swivel, the upper end of said column projecting above the frame, a rotatably-mounted shaft carried by the frame, a circular disk carried by the upper end of said shaft, a lever connected to the upper end of the frame, rods connecting the circular disk, the upper end of the column and the two ends of the lever, and mechanism for rotating said shaft for causing the rods and lever to impart a rotary tilting motion to the upper end of the column.

11. In a machine of this character, the combination of a frame, a swivel carried in the lower end thereof and vertical column having its lower end connected to said swivel, the upper end of said column projecting above the frame, a rotatably-mounted shaft carried by the frame, a circular disk carried by the upper end of said shaft, an adjustable lever connected to the upper end of the frame, rods connecting the circular disk, the upper end of the column and the two ends of the lever, and mechanism for rotating said shaft for causing the rods and lever to impart a rotary tilting motion to the upper end of the column.

12. In a machine of this character, the combination of a frame, a vertical shaft having its lower end swivelly mounted within the frame and projecting above, means for supporting the testing-bottles carried upon the upper end of the shaft, mechanism connected to the upper end of the shaft and mounted upon the frame for limiting the elliptical movement of the upper end of the shaft, and mechanism connected with the first-mentioned mechanism for operating the same to impart to the upper end of the shaft an outwardly-tilting and elliptical movement.

13. In a machine of this character, the combination of a framework, a vertical column having its lower end swivelly mounted within the frame and its upper end projecting above the frame, rods pivotally connected to the upper end of the column and adjustably connected to the upper part of the frame, and mechanism for operating the rods to impart a rotary motion to the upper end of the column.

14. In a machine of this character, the combination of a frame, a swivel mounted in the lower end thereof, a vertical column having its lower end connected to said swivel, a rotatably-mounted shaft carried by the frame, a lever connected to the upper end of the frame, rods connected to the upper end of said swivel and to the upper end of the column and to both ends of the lever, and mechanism for revolving said shaft to impart the proper motion to the column.

15. In a machine of this character, the combination of a frame, a swivel mounted in the lower end thereof, a vertical column having its lower end connected to said swivel, a rotatably-mounted shaft carried by the frame, an adjustable lever connected to the upper end of the frame, rods connected to the upper end of said swivel, to the upper end of the column and to both ends of the adjustable lever, and mechanism for revolving the said shaft to impart the proper motion to the column.

16. In a machine of this character, the combination of a frame, a column having its lower end swivelly mounted within the frame, and its upper end projecting above the frame, a bottle-supporting platform supported by the upper end of said frame, a rotatably-mounted shaft carried by the frame, a lever connected to the upper end of the frame, rods pivotally connected to the upper end of the column, to the shaft, and both ends of said lever, and mechanism for rotating the shaft to impart to the upper end of the column a rotary tilting motion.

17. In a machine of this character, the combination of a frame, a column having its lower end swivelly mounted within the frame, and its upper end projecting above the frame, a bottle-supporting platform supported by the upper end of said frame, a rotatably-mounted shaft carried by the frame, an adjustable lever connected to the upper end of the frame, rods pivotally connected to the upper end of the column, to the shaft, and both ends of said adjustable lever, and mechanism for rotating the shaft to impart to the upper end of the column a rotary tilting motion.

In testimony whereof I affix my signature in presence of two witnesses.

DANIEL DRAWBAUGH.

Witnesses:
CLARENCE W. FETTION,
GEORGE W. DRAWBAUGH, Jr.